Figures 1, 2, 3:
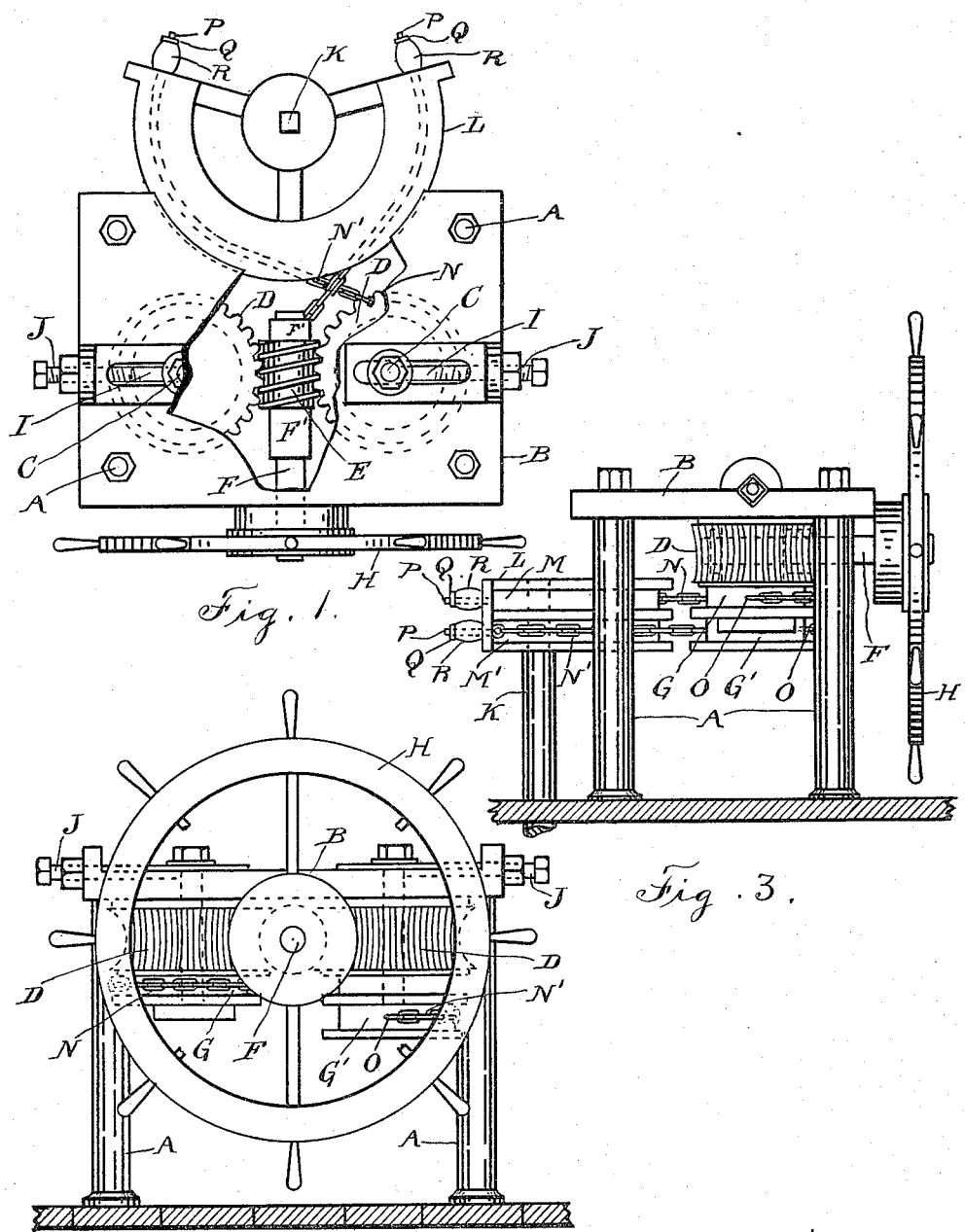

N. WILKINSON.
SHIP STEERING GEAR.
APPLICATION FILED JUNE 9, 1915.

1,155,022.

Patented Sept. 28, 1915.

INVENTOR
Noah Wilkinson

UNITED STATES PATENT OFFICE.

NOAH WILKINSON, OF LEWISTON, MAINE, ASSIGNOR OF ONE-HALF TO ARA CUSHMAN, JR., OF AUBURN, MAINE.

SHIP STEERING-GEAR.

1,155,022. Specification of Letters Patent. Patented Sept. 28, 1915.

Application filed June 9, 1915. Serial No. 33,016.

*To all whom it may concern:*

Be it known that I, NOAH WILKINSON, a citizen of the United States, residing at Lewiston, in the county of Androscoggin and State of Maine, have invented certain new and useful Improvements in Ship Steering-Gear, of which the following is a specification.

This invention relates to improvements in ship steering gear.

It is designed to provide an apparatus which is compact and strong, which operates uniformly at all points of turning, which has transmitting cables that do not come in contact with each other, which prevents shock and jar to the rudder being transmitted to the wheel and which is in all respects readily adjusted.

In the drawings herewith accompanying and making a part of this application Figure 1 is a plan view of my improved steering gear, a portion of the frame plate being removed; Fig. 2 is an end view of the same and Fig. 3 is a side elevation of the same.

Same reference characters indicate like parts in the several figures.

In said drawings A represents the supporting posts and B the top frame plate which is secured to said posts in any convenient manner. Mounted in said frame plate are vertical rods C, one on each side and spaced apart from each other and set on these rods are gears D which mesh with a worm E on a horizontal shaft F, mounted in bearings F' on the under side of the frame plate. Below the gears on rods C are pulleys G and G' which may, if desired, be formed integral with said gears. One of said pulleys, G' for instance, is positioned lower than the other, as shown in Figs. 2 and 3. Shaft F is provided with the usual wheel head H. The gears are adjustable relative to the worm, the rods C upon which they are mounted being free to move in slots I in frame plate B. The gears are adapted to be adjusted relative to the worm in any position and held by means of screw bolts J. On rudder head K is rigidly secured an operating lever L, preferably in the form of a segment of a circle, having in its periphery two grooves M and M', one above the other. Said grooves are substantially in line with the grooves in the pulleys on the gear posts. Power transmitting cables N and N' are secured to the pulleys in any convenient manner, as by screw eyes O. These cables cross between the gears and lever and are secured to the opposite ends of the lever by bolts P loosely mounted in the lever and secured by nuts Q. Between the nuts and the lever are placed elastic buffers R which may be of any resilient material, rubber being shown. The cables travel in the grooves in the pulleys and in the rudder operating lever and are arranged so that when the worm is turned it causes the gears which mesh therewith to turn in opposite directions, and the cables running in the pulleys and rudder lever cause the rudder to turn in one direction or the other, according as the worm operating wheel is turned. The worm operating shaft may be operated by hand or by power not shown.

The advantages of my improved apparatus are many, among which may be mentioned: that it can be very compactly arranged; that there is no friction between the power transmitting cables; that no unusual shock and jar to the rudder can be harmfully transmitted to the wheel, and that all parts of the mechanism can be readily adjusted to overcome any lost motion due to the wear of the parts.

Having thus described my invention and its uses, I claim:

1. In a ship steering apparatus, a supporting frame, a shaft operated worm mounted therein, two gears mounted therein and adapted to mesh with said worm, pulleys operable contemporaneously with said gears, said pulleys being mounted in different planes, a rudder operating lever provided with grooves in different planes and transmitting cables secured to said pulleys and operating lever.

2. In a ship steering apparatus, a supporting frame, a shaft operated worm mounted therein, two gears mounted therein and adapted to mesh with said worm, pulleys operable contemporaneously with said gears, said pulleys being mounted in different planes, a rudder operating lever provided with grooves in different planes and transmitting cables secured to said pulleys and operating lever, the ends of said cables being yieldingly mounted in said rudder operating lever.

3. In a ship steering apparatus, a supporting frame, a shaft operated worm mounted therein, two gears mounted therein and adapted to mesh with said worm, means for adjusting the gears relative to the worm, pulleys operable contemporaneously with said gears, said pulleys being mounted in different planes, a rudder operating lever provided with grooves in different planes and transmitting cables secured to said pulleys and operating lever.

In testimony whereof I have affixed my signature.

NOAH WILKINSON.